US011726816B2

(12) United States Patent
Wiggers et al.

(10) Patent No.: US 11,726,816 B2
(45) Date of Patent: Aug. 15, 2023

(54) SCHEDULING WORKLOADS ON A COMMON SET OF RESOURCES BY MULTIPLE SCHEDULERS OPERATING INDEPENDENTLY

(71) Applicant: VMware, Inc., Palo Alto, CA (US)

(72) Inventors: Maarten Wiggers, San Francisco, CA (US); Rajesh Venkatasubramanian, San Jose, CA (US); Sahan Bamunavita Gamage, San Jose, CA (US); Pranshu Jain, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 300 days.

(21) Appl. No.: 16/943,710

(22) Filed: Jul. 30, 2020

(65) Prior Publication Data
US 2022/0035662 A1 Feb. 3, 2022

(51) Int. Cl.
*G06F 9/48* (2006.01)
*G06F 9/50* (2006.01)
*G06F 9/455* (2018.01)

(52) U.S. Cl.
CPC ........ *G06F 9/4881* (2013.01); *G06F 9/45558* (2013.01); *G06F 9/505* (2013.01); *G06F 9/5077* (2013.01); *G06F 2009/4557* (2013.01); *G06F 2209/505* (2013.01)

(58) Field of Classification Search
None
See application file for complete search history.

(56) References Cited

U.S. PATENT DOCUMENTS

| 7,203,944 B1* | 4/2007 | van Rietschote ..... G06F 9/5088 |
| | | 718/1 |
| 7,707,578 B1 | 4/2010 | Zedlewski et al. |
| 8,037,280 B2* | 10/2011 | Pandey ................. G06F 9/5033 |
| | | 711/E12.001 |
| 8,667,500 B1 | 3/2014 | Ji et al. |
| 8,775,413 B2* | 7/2014 | Brown ............. G06F 16/24549 |
| | | 707/718 |
| 8,850,432 B2 | 9/2014 | McGrath et al. |
| 9,116,929 B2* | 8/2015 | Morris .................... G06F 16/17 |

(Continued)

OTHER PUBLICATIONS

Grandl et al. "Multi-Resource Packing for Cluster Schedulers," ACM SIGCOMM Computer Communication Review, vol. 44, No. 4, 2014, pp. 455-466.

(Continued)

*Primary Examiner* — Van H Nguyen
(74) *Attorney, Agent, or Firm* — Kim & Stewart LLP (57) ABSTRACT

Workloads are scheduled on a common set of resources distributed across a cluster of hosts using at least two schedulers that operate independently. The resources include CPU, memory, network, and storage, and the workloads may be virtual objects, including VMs, and also operations including live migration of virtual objects, network file copy, reserving spare capacity for high availability restarts, and selecting hosts that are to go into maintenance mode. In addition, the at least two independent schedulers are assigned priorities such that the higher priority scheduler is executed to schedule workloads in its inventory on the common set of resources before the lower priority scheduler is executed to schedule workloads in its inventory on the common set of resources.

19 Claims, 6 Drawing Sheets

(56) References Cited

U.S. PATENT DOCUMENTS

| | | | |
|---|---|---|---|
| 9,304,803 B2 * | 4/2016 | Nelson | G06F 9/45558 |
| 9,507,631 B2 * | 11/2016 | Chen | G06F 9/4856 |
| 10,241,840 B2 * | 3/2019 | Tsai | G06F 9/5077 |
| 10,374,887 B2 | 8/2019 | Kerpez et al. | |
| 10,379,908 B2 | 8/2019 | Vyas et al. | |
| 10,505,815 B2 | 12/2019 | Padala et al. | |
| 10,871,998 B2 | 12/2020 | Parees et al. | |
| 10,977,086 B2 | 4/2021 | Jha et al. | |
| 11,182,196 B2 | 11/2021 | Gamage et al. | |
| 11,372,688 B2 * | 6/2022 | Wang | G06F 9/5077 |
| 2008/0028411 A1 | 1/2008 | Cherkasova et al. | |
| 2010/0325637 A1 | 12/2010 | Radmilac et al. | |
| 2015/0143381 A1 | 5/2015 | Chin et al. | |
| 2015/0154056 A1 * | 6/2015 | Chen | G06F 9/4856 |
| | | | 718/103 |
| 2019/0220319 A1 | 7/2019 | Parees et al. | |
| 2019/0223023 A1 | 7/2019 | Altay et al. | |
| 2020/0192724 A1 * | 6/2020 | Wang | G06F 9/5077 |

OTHER PUBLICATIONS

Tian et al. "A Dynamic MapReduce Scheduler for Heterogeneous Workloads," 2009 Eighth International Conference on Grid and Cooperative Computing, IEEE, 2009, pp. 218-224.
International Search Report and Written Opinion dated Nov. 4, 2021 in corresponding International Application No. PCT/US2021/043248, 8 pages.
U.S. Appl. No. 16/838,690, filed Apr. 2, 2020, 44 pages.
U.S. Appl. No. 16/681,990, filed Nov. 13, 2019, 40 pages.
Non-Final Office Action dated May 10, 2023 in U.S. Appl. No. 17/154,776, 25 pages.

* cited by examiner

SCHEDULING WORKLOADS ON A COMMON SET OF RESOURCES BY MULTIPLE SCHEDULERS OPERATING INDEPENDENTLY

BACKGROUND

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into a logical unit called a "pod." Containers in the same pod share the same resources and network and maintain a degree of isolation from containers in other pods. The pods are distributed across nodes of the Kubernetes system and an image cache is provided on each node to speed up pod deployment. A node includes an operating system (OS), such as Linux®, and a container engine executing on top of the OS that supports the containers of the pod, Kubernetes control plane components (e.g., a kubelet) execute on the OS alongside the containers. Thus, a node includes multiple containers and control plane components executing on a shared OS.

Kubernetes nodes can be implemented in a virtualized computing system including a cluster of hosts having a virtualization layer executing on host hardware platforms to support execution of virtual machines (VMs). In this system, each host in the cluster operates as a Kubernetes node and Kubernetes pods are implemented as VMs (hereinafter referred to as "pod VMs"), each of which includes an OS and a container engine that supports execution of containers therein. Such a Kubernetes system further includes other VMs that implement the Kubernetes control plane components and support applications implemented using the pod VMs.

The integration of the Kubernetes control plane into the virtualization computing system results in scheduling complexities because the Kubernetes control plane employs a scheduler for placing pods on nodes (which, in the integrated system, means pod VMs being scheduled on hosts of the cluster), and the virtualization computing system employs a scheduler for placing VMs, including pod VMs, on the same hosts of the cluster. These schedulers, each running its own scheduling algorithm, may decide on different hosts to place a pod VM.

U.S. patent application Ser. No. 16/681,990 discloses a technique in which the VM scheduler cooperates with a Kubernetes scheduler when placing pod VMs on a cluster of hosts. In this technique, the Kubernetes scheduler includes an extension which communicates with the VM scheduler to request and acquire a host recommendation when placing a pod VM on the cluster of hosts.

SUMMARY

One or more embodiments provide a method for scheduling workloads using at least two schedulers that operate independently. The workloads may be virtual objects, including VMs, and also operations including live migration of virtual objects, network file copy, reserving spare capacity for high availability restarts, and selecting hosts that are to go into maintenance mode. According to embodiments, these workloads are scheduled on a common set of resources that are distributed across a cluster of hosts. These resources include CPU, memory, network, and storage. In addition, the at least two independent schedulers are assigned priorities such that the higher priority scheduler is executed to schedule workloads in its inventory on the common set of resources before the lower priority scheduler is executed to schedule workloads in its inventory on the common set of resources.

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
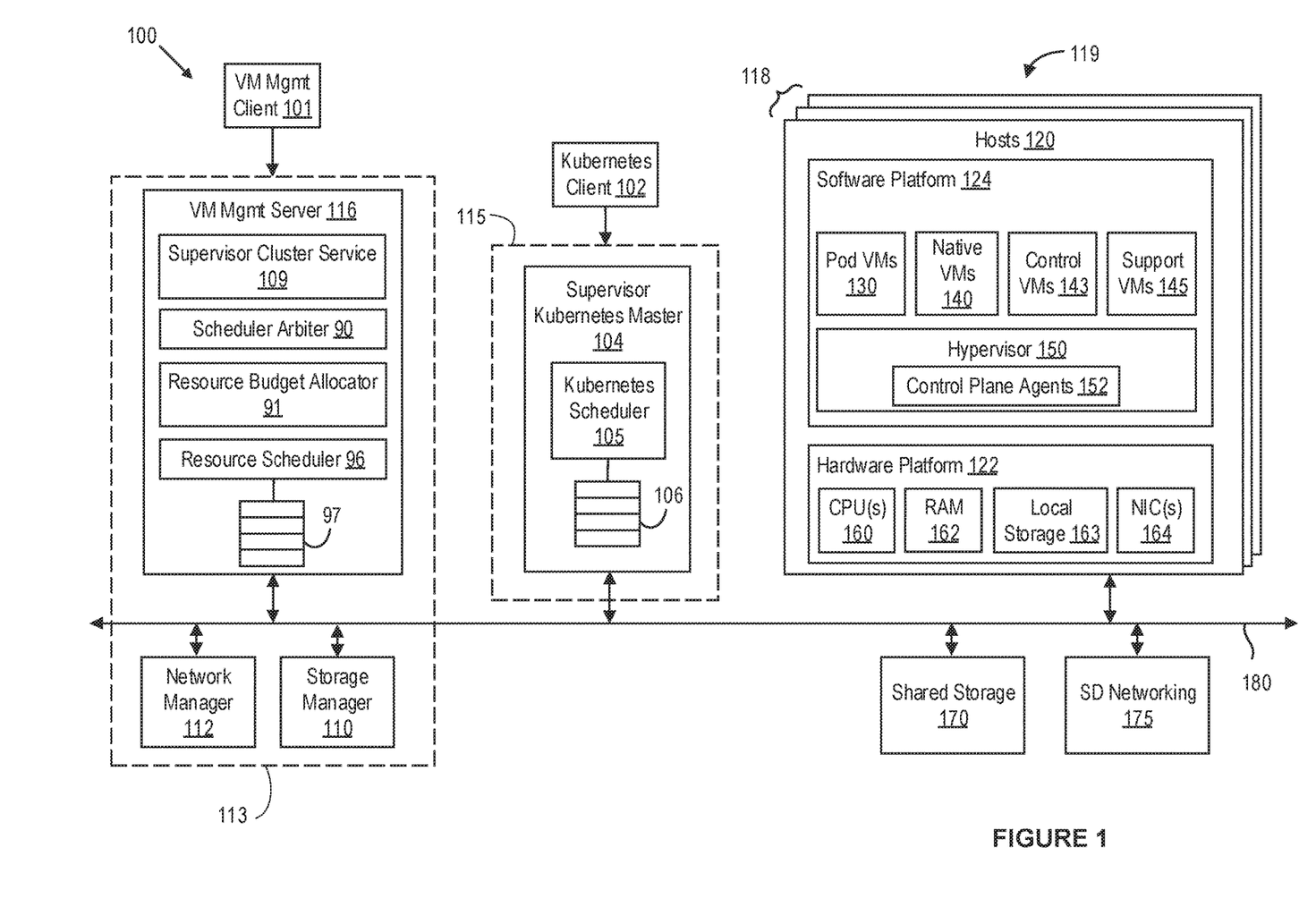
FIG. 1 is a block diagram of a virtualized computing system in which embodiments may be implemented.

FIG. 1 is a block diagram of a virtualized computing system 100 in which embodiments may be implemented. Virtualized computing system 100 includes a cluster 118 of hosts 120 that may be constructed on server-grade hardware platforms such as an x86 architecture platforms (also referred to as "host cluster 118"). As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a network 180. Network 180 is a physical network that enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 includes one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.).

Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. As shown in FIG. 1, VMs executing on each host 120 include pod VMs 130 and native VMs 140. A pod VM 130 is a virtual machine that includes an OS and container engine that supports execution of containers, as well as an agent (referred to as a pod VM agent) that cooperates with a controller of orchestration control plane 115 executing in hypervisor 150 (referred to as a pod VM controller). Some native Vis 140 have specific functions within host cluster 118, such as control VMs 143 and support VMs 145. Control VMs 143 are VMs that implement control planes as described further herein. Support. VMs 145 are VMs that are created by a control plane to support applications implemented using pod VMs 130 and/or native VMs 140.

Software platform 124 is configured with software-defined (SD) networking 175. SD networking 175 includes a data plane having various logical components, such as routers, switches, gateways, firewalls, load balancers, and the like, coupled to form logical networks that overlay network 180. The terms "logical" and "virtual" are used interchangeably herein with respect to SD networking 175. SD networking 175 includes a control plane configured to manage the data plane. Some components of the control and data planes are implemented as support VMs 145 (e.g., logical router control VMs, load balancers, edge gateways, etc.). Other components are implemented as part of hypervisor 150 (e.g., logical switches, logical routers, distributed firewalls, etc.).

VM management server 116 is a physical or virtual server that provisions VMs from the hardware resources of hosts 120. VM management server 116 installs a control plane agent 152 in hypervisor 150 to add a host 120 to as a managed entity. VM management server 116 logically groups hosts 120 into cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in the cluster may be one or many. Each host 120 in cluster 118 has access to shared storage 170 via network 180). VM management server 116 can also communicate with shared storage 170 via network 180 to perform control operations thereon.

VM management server 116 further includes a supervisor duster service 109. Supervisor cluster service 109 configures host cluster 118 to be part of a supervisor cluster 119. Supervisor cluster service 109 installs a control plane agent 152 in hypervisor 150 to add a host 120 to supervisor cluster 119. Supervisor cluster 119 integrates an orchestration control plane, such as Kubernetes, into host cluster 118. In supervisor cluster 119, hosts 120 become nodes for use by the orchestration control plane.

Supervisor cluster service 109 provisions one or more virtual servers as "master servers" to manage the orchestration control plane. In the embodiment of FIG. 1, supervisor cluster 119 includes a supervisor Kubernetes master 104 that functions as a master server for an orchestration control plane 115 of supervisor cluster 119. For purposes of clarity, supervisor Kubernetes master 104 is shown as a separate logical entity. In practice, supervisor Kubernetes master 104 may be implemented as control VMs 143 in host cluster 118. Further, although only one supervisor Kubernetes master 104 is shown, supervisor cluster 119 can include more than one supervisor Kubernetes master 104.

In the embodiment illustrated in FIG. 1, workloads that are scheduled on resources include pod VMs 130, native VMs 140, control VMs 143, and support VMs 145. These workloads are scheduled on a common set of resources, e.g., resources of a set of hosts 120 that belong to both host cluster 118 and supervisor cluster 119, by two independent schedulers—resource scheduler 96 and Kubernetes scheduler 105. A workload inventory 97 contains workloads to be scheduled by resource scheduler 96 and a workload inventory 106 contains workloads to be scheduled by Kubernetes scheduler 105. Resource scheduler 96 runs as a process in VM management server 116 to schedule the workloads in its workload inventory 97 on a set of hosts 120 of host cluster 118 and Kubernetes scheduler 105 runs as a process in supervisor Kubernetes master 104 to schedule the workloads in its workload inventory 106 on the same set of hosts 120 of supervisor cluster 119.

Workloads are added to workload inventories 97, 106 under various circumstances. In one embodiment, if a host 120 fails, control VMs 143 and support VMs 145 that were executing on the failed host (of host duster 118) are added to workload inventory 97 and all pod VMs 130 that were executing on that same failed host (of supervisor cluster 119) are added to workload inventory 106. Native VMs 140 executing on the failed host, which are components of the application deployed using orchestration control plane 115 are added to workload inventory 106. Other native VMs 140 are added to workload inventor 97.

VM management server 116 further includes a scheduler arbiter 90 that enforces the order of scheduling priority given to independent schedulers. Generally, the relative scheduling priorities of independent schedulers are pre-defined by the developer of virtualized computing system 100. In the embodiments illustrated herein, resource scheduler 96 is assigned the higher priority relative to Kubernetes scheduler 105. Therefore, scheduler arbiter 90 allows resource scheduler 96 to execute (to schedule the workloads that are in its workload inventory 97) prior to allowing Kubernetes scheduler 105 to execute (to schedule the workloads in its workload inventory 106). In some embodiments, scheduler arbiter 90 executes a process, shown in FIG. 1 as resource budget allocator 91, to set resource budgets for each of the independent schedulers. The resource budgets may be set at the cluster level or at the individual host level. In addition, the resource budget may be set for all or a subset of workloads managed by resource scheduler 96 or Kubernetes scheduler 105. When the resource budget is set for a scheduler, that scheduler is prevented from scheduling any workload in its workload inventory that will cause the scheduled resource usage to be in excess of the scheduler's resource budget. When the resource budget is set for a subset of workloads managed by a scheduler, that scheduler is prevented from scheduling any workload in the subset and in its workload inventory that will cause the scheduled resource usage to be in excess of the scheduler's resource budget for the subset. When the resource budgets are set at the individual host level, a granularity for the resource may be additionally set. The granularity defines the minimum size of a particular resource that can be set at the individual host level. Therefore, if the granularity for memory is 1 GB and the total memory budget across a cluster of 10 hosts is 5 GB, it will prevent the budget to be set at 0.5 GB per host across 10 hosts. Instead, the budget will be set at 1 GB (or more) across 5 hosts (or less) and 5 hosts will get a memory budget of 0 GB.

Virtualized computing system 100 further includes storage manager 110. Storage manager 110 is a physical or virtual server that provisions virtual disks in shared storage 170 (or a vSAN formed from local storage 163) as independent objects. That is, virtual disks that persist apart from the lifecycle of any VM or container. Various components can interact with storage manager 110 to provision persistent storage, such as VM management server 116 and supervisor Kubernetes master 104. Storage manager 110 can operate independently from VM management server 116 (e.g., as an independent physical or virtual server). Alternatively, storage manager 110 can be a service in VM management server 116 (e.g., alongside components such as resource scheduler 108 and supervisor cluster service 109).

Virtualized computing system 100 further includes a network manager 112. Network manager 112 is a physical or virtual server that manages SD networking 175 for hosts 120. Network manager 112 can install a control plane agent 152 in hypervisor 150 to add a host 120 as a managed entity. Network manager 112 configures host cluster 118 to be part of a transport zone. In such a transport zone, hosts 120 become transport nodes having shared logical networking resources. Network manager 112 can operate independently from VM management server 116 (e.g., as an independent physical or virtual server). Alternatively, network manager 112 can be a service of VM management server 116 (e.g., alongside components such as resource scheduler 108 and supervisor cluster service 109).

A VI administrator (VI admin) can interact with VM management server 116 through a VM management client 101. Through VM management client 101, a VI admin commands VM management server 116 to form host cluster 118, configure resource pools, resource allocation policies, and other cluster-level functions, configure storage and networking, and create supervisor cluster 119.

Kubernetes client 102 represents an input interface to supervisor Kubernetes master 104. Kubernetes client 102 is commonly referred to as kubectl. Through Kubernetes client 102, a user submits desired states of the Kubernetes system, e.g., as YAWL documents, to supervisor Kubernetes master 104. In response, supervisor Kubernetes master 104 configures supervisor cluster 119 to match the desired state by creating pod VMs 130 and native VMs 140, connecting the VMs to storage and logical networks, destroying pod VMs 130 and native VMs 140, and the like. In this manner, the user interacts with supervisor Kubernetes master 104 to deploy applications in supervisor cluster 119.

Figure 2:
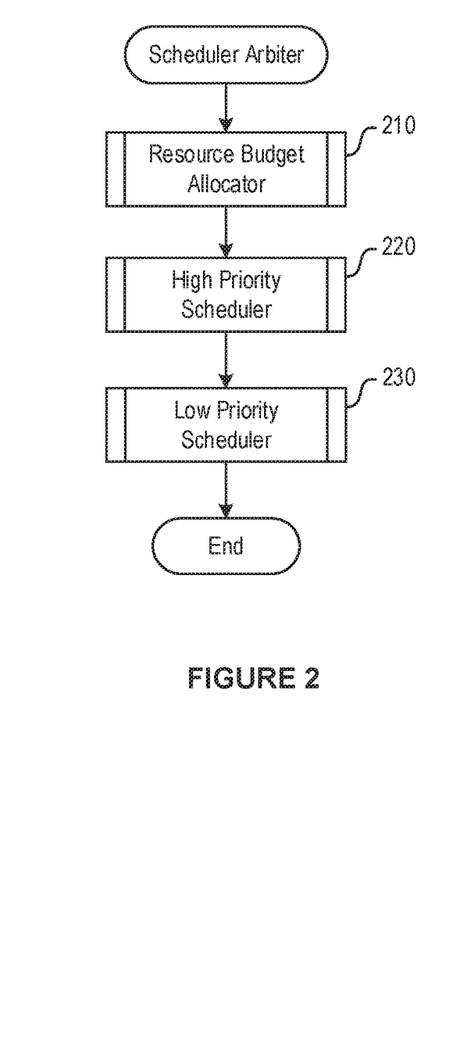
FIG. 2 is a flow diagram depicting steps of a method carried out by a scheduler arbiter according to embodiments.

FIG. 2 is a flow diagram depicting steps of a method carried out by a scheduler arbiter 90 according to embodiments. Scheduler arbiter 90 enforces the scheduling priority of independent schedulers by executing a high priority scheduler (process 220) prior to a low priority scheduler (process 230). In the embodiment illustrated in FIG. 1, the high priority scheduler is resource scheduler 96 and the low priority scheduler is Kubernetes scheduler 105. In embodiments with more than two independent schedulers, the highest priority scheduler is executed first, the second highest priority scheduler is executed second, and so forth until all schedulers are executed.

Figure 3:
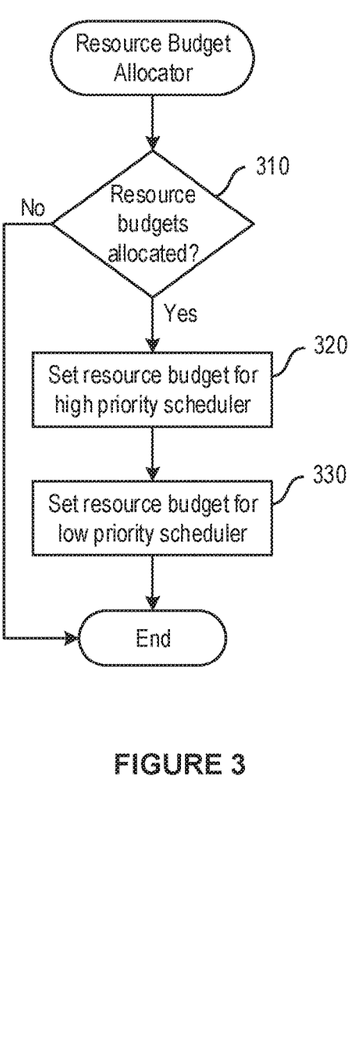
FIG. 3 is a flow diagram depicting steps of a method carried out by a resource budget allocator according to embodiments.

Scheduler arbiter 90 also executes a process 210 (e.g., resource budget allocator 91) to set resource budgets to each of the independent schedulers. The steps executed by resource budget allocator 91 are illustrated in FIG. 3. The method of FIG. 3 begins at step 310, at which resource budget allocator 91 determines if resource budgets are allocated. If no resource budget is allocated to a scheduler, no resource limit is imposed on the scheduler and the scheduler will attempt to schedule all workloads in its inventory until resources are no longer available. If resources are still available after all workloads in the scheduler's inventory have been scheduled, the scheduler having the next highest priority will execute.

Steps 320 and 330 are executed if resource budgets are allocated. At step 320, resource budget allocator 91 sets the resource budget for the high priority scheduler, and at step 330, resource budget allocator 91 sets the resource budget for the low priority scheduler. In embodiments with more than two independent schedulers, additional steps are executed to set the resource budgets for all schedulers.

Figure 4:
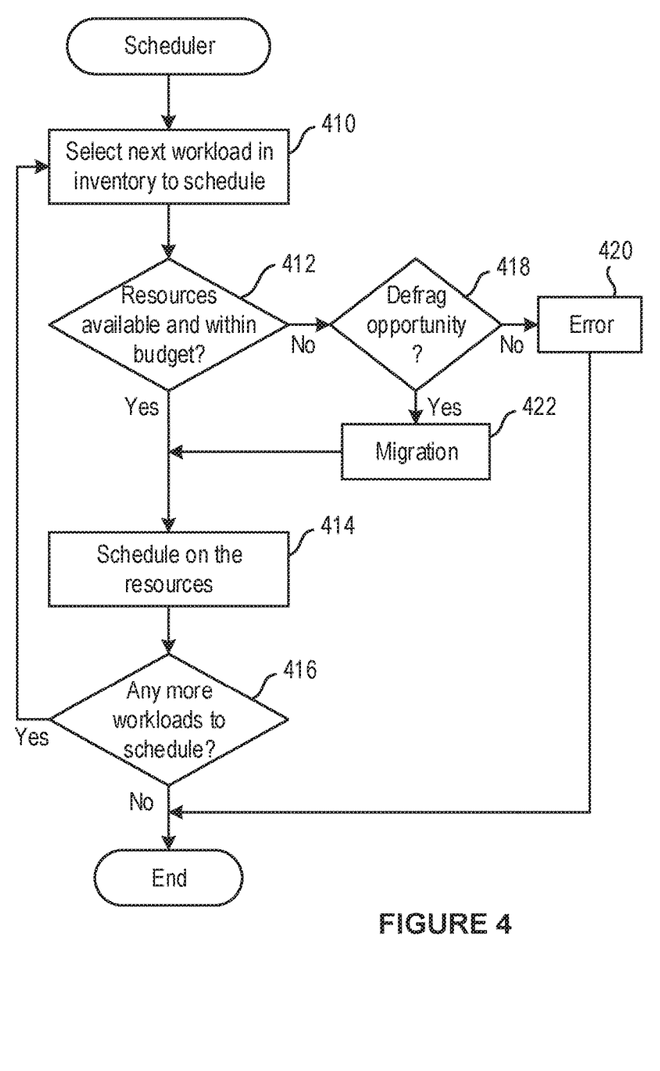
FIG. 4 is a flow diagram depicting steps of a method carried out by each scheduler according to embodiments.

FIG. 4 is a flow diagram depicting steps of a method carried out by each scheduler according to embodiments. The method of FIG. 4 is applicable to any of the independent schedulers including the high priority scheduler and the low priority scheduler, and begins at step 410, where the scheduler selects the next workload in its inventory to schedule. Then, at step 412, the scheduler determines if there are sufficient resources for scheduling the selected workload and if the scheduling of the selected workload will cause it to exceed its resource budget. If there are sufficient resources for scheduling the selected workload and the scheduling of the selected workload will not cause it to exceed its resource budget (step 412, Yes), the scheduler schedules the selected workload on the resources at step 414. On the other hand, if the resources for scheduling the selected workload are insufficient or the scheduling of the selected workload will cause the scheduler to exceed its resource budget (step 412, No), the scheduler examines the resource usage by workloads that it previously scheduled, to see if there is an opportunity to defragment (step 418). For example, if the memory requirement of a VM that needs to be scheduled is greater than what a single host in host cluster 118 can provide, a defragmentation process can be executed to live migrate one or more VMs from one host in host cluster 118 to one or more other hosts in host cluster 118 to free up enough memory in the one host for the VM that needs to be scheduled. If there is no opportunity to defragment, an error is returned at step 420. If there is opportunity to defragment, migration is carried out at step 422 to free up resources on one of the hosts in host cluster 118. Upon completion of the migration, step 414 is executed to schedule the selected workload on the resources of the freed-up host. If the selected workload is not a VM, which is stateful, but a different virtual object, which is stateless, migration is carried out by terminating the running instance of the virtual object in one host and instantiating the virtual object in another host.

In some embodiments, the opportunity to defragment to free up space for scheduling a workload by the high priority scheduler may be achieved by defragmenting workloads previously scheduled by the low priority scheduler. In such a case, the high priority scheduler makes such a defragmentation request to the lower priority scheduler (e.g., by calling an API exposed by the low priority scheduler).

In further embodiments, a high priority scheduler may request a larger budget allocation from resource budget allocator 91. Resource budget allocator 91 fulfills this request by reducing the resource budget allocated to a low priority scheduler or by setting up a buffer of resources and allocating resources from this buffer. The pool of resources available in this buffer is decreased as resources are allocated from this buffer to the schedulers, and increased as resources are freed up by the schedulers and returned to this buffer.

After step 414, the scheduler determines if there are any more workloads in its inventory to schedule. If there are, the process returns to step 410, where the scheduler selects the next workload in its inventory to schedule. If there are no more, the process ends.

Figure 5:
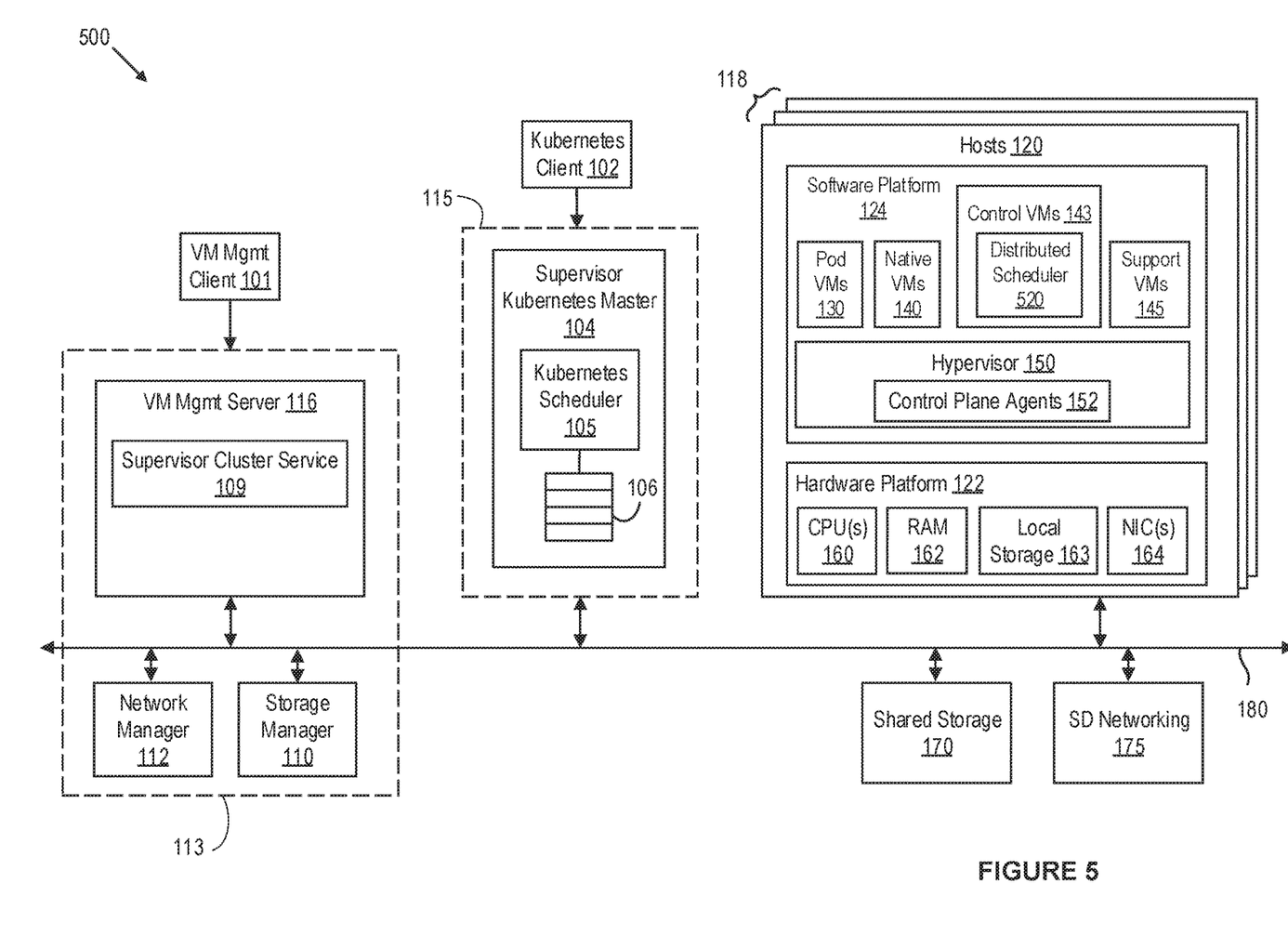
FIG. 5 is a block diagram of another virtualized computing system in which embodiments may be implemented.

In some embodiments, one or more of the functions of VM management server 116, network manager 112, and storage manager 110 may be implemented using control VMs 143. Virtualized computing system 500 of FIG. 5 depict an embodiment where the functions of scheduler arbiter 90, resource budget allocator 91, and resource scheduler 96 are distributed across hosts 120 in control VMs 143 of hosts 120 as a distributed scheduler 520.

Figure 6:
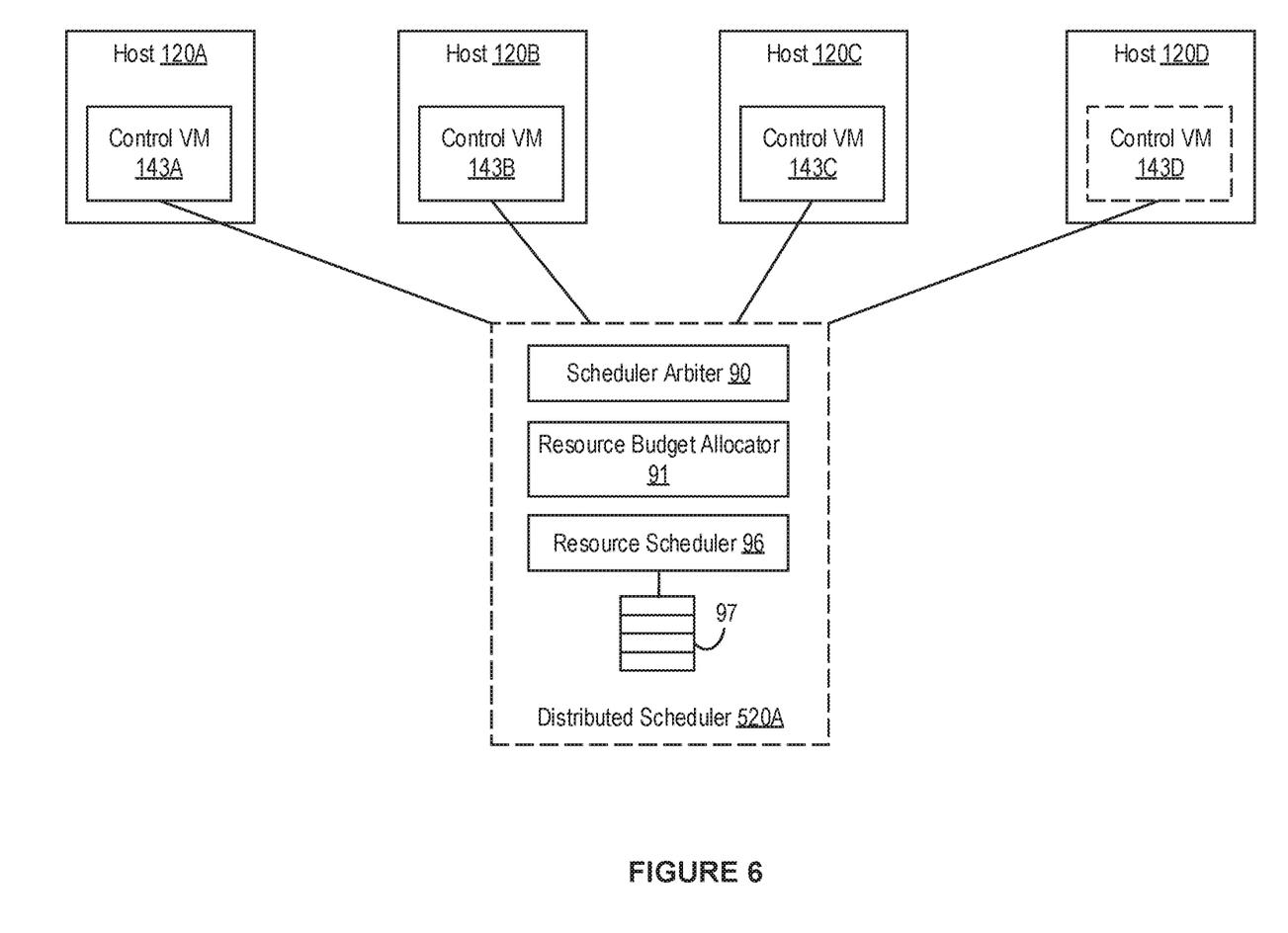
FIG. 6 is a conceptual diagram illustrating an implementation of a distributed scheduler in the virtualized computing system of FIG. 5.

FIG. 6 depicts an example where control VMs 143A, 143B, 143C running in hosts 120A, 120B, 120C, respectively, cooperate with each other to execute the functions of scheduler arbiter 90, resource budget allocator 91, resource scheduler 96, and workload inventory 97, as distributed scheduler 520A. The fourth control VM, control VM 143D running in host 120D is a spare control VM that is able to replace any one of control VMs 143A, 143B, 143C that fails.

In some embodiments, a running instance of control VM 143D is not necessary. Instead of the running instance of control VM 143D, resource scheduler 96 reserves spare capacity for control VM 143D in host 120D for control VM 143D to consume when instantiated, e.g., when one of control VMs 143A, 143B, 143C goes down.

Figure 7:
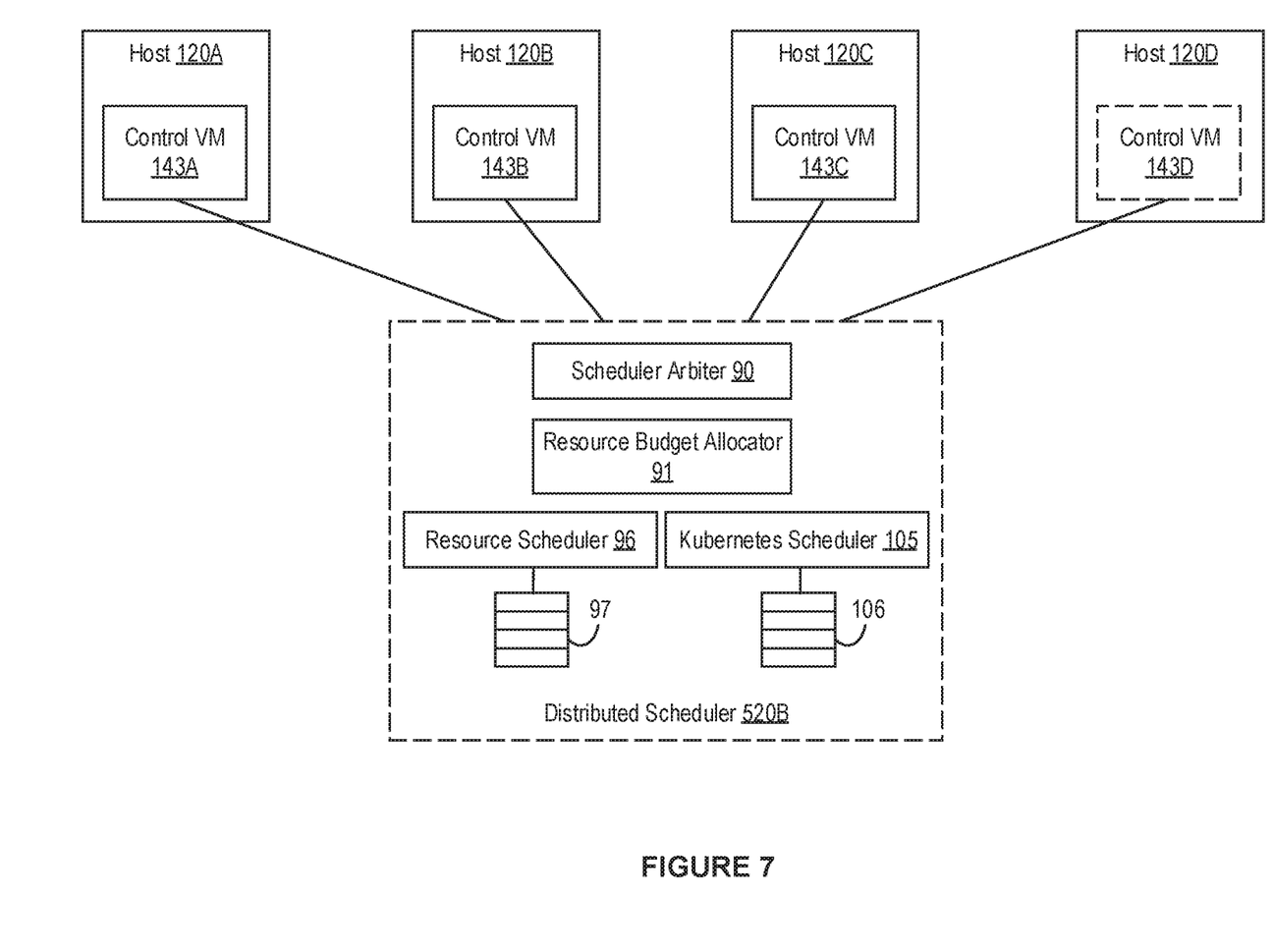
FIGS. 7-8 are conceptual diagrams illustrating other implementations of the distributed scheduler.

In a similar manner, the functions of supervisor Kubernetes master 104 including those of Kubernetes scheduler 105 and workload inventory 106 may be distributed across hosts 120 in control VMs 143 of hosts 120. FIG. 7 illustrates a distributed scheduler 520B that implements the functionality of and Kubernetes scheduler 105 and workload inventory 106, in addition to scheduler arbiter 90, resource budget allocator 91, resource scheduler 96, and workload inventory 97.

Figure 8:
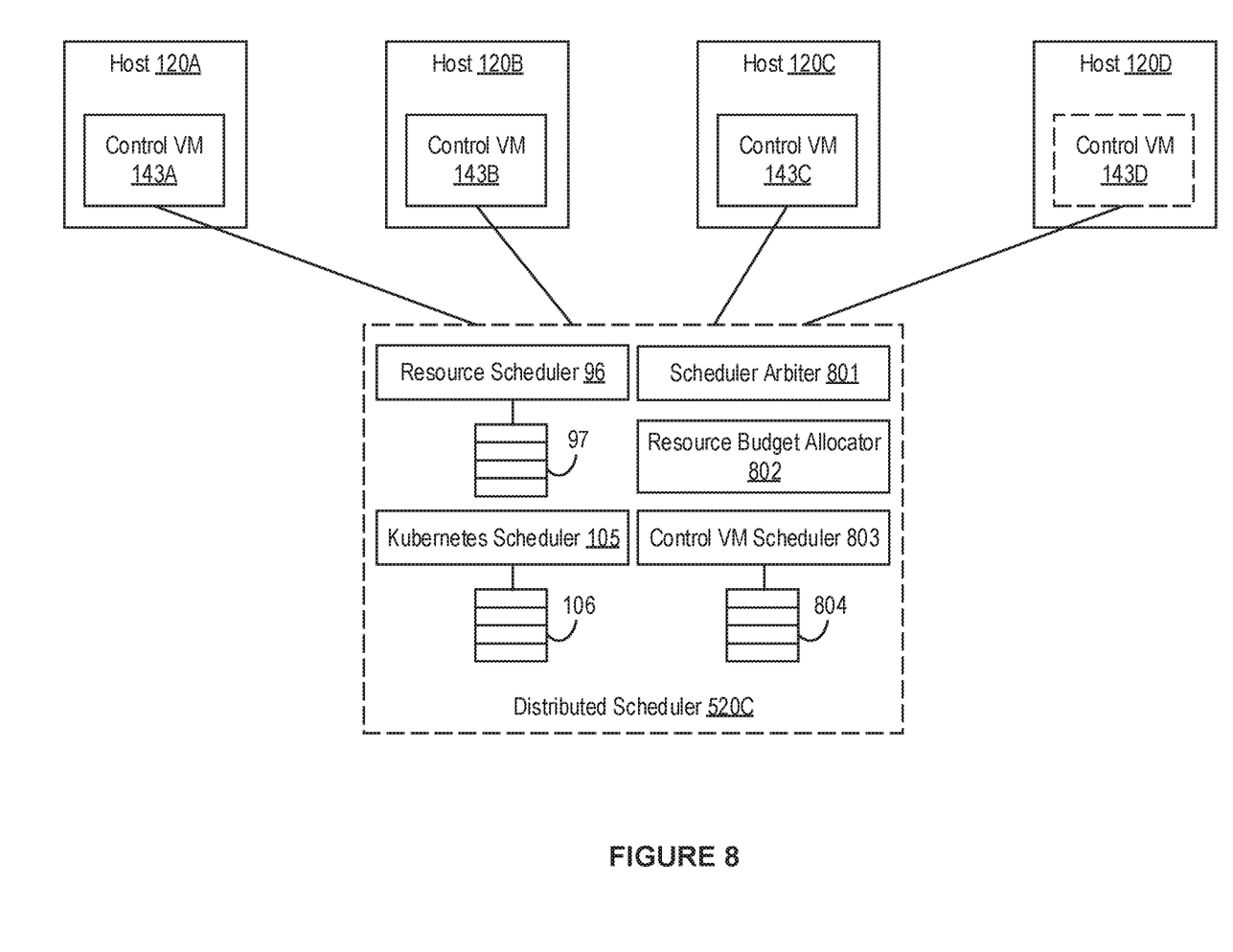

FIG. 8 depicts another example of the distributed scheduler, distributed scheduler 520C, which implements the functionality of three independent schedulers. In addition to resource scheduler 96 (and workload inventory 97) and Kubernetes scheduler 105 (and workload inventory 106), distributed scheduler 520C includes a control VM scheduler 803 for scheduling workloads in its workload inventory 804 (e.g., control VMs 143, including control VMs 143A, 143B 143C, 143D) on the same set of resources as resource scheduler 96 and Kubernetes scheduler 105. Scheduler arbiter 801 is a modified version of scheduler arbiter 90. To accommodate a third independent scheduler, scheduler arbiter 801 executes a high priority scheduler, middle priority scheduler, and a low priority scheduler in that order after executing resource budget allocator 802. In a similar manner, resource budget allocator 802 is modified from resource budget allocator 91 to accommodate the third independent scheduler. In addition to setting the resource budgets for the high priority scheduler and the low priority scheduler, resource budget allocator 802 sets the resource budget for the middle priority scheduler. In one embodiment, control VM scheduler 803 is the high priority scheduler, resource scheduler 96 the middle priority scheduler, and Kubernetes scheduler 105 the low priority scheduler.

In the embodiments described above, VMs represent the scheduled workloads and resources of the hosts in a cluster represent the common set of resources on which the workloads are scheduled. In other embodiments, the scheduled workloads may be any virtual object including virtual compute, storage, and network resources, and also operations including live migration of virtual objects, network file copy, reserving spare capacity for high availability restarts, and selecting hosts that are to go into maintenance mode. More generally, the scheduled workloads may be any process consuming resources that need to be scheduled. Also, the independent schedulers may be two or more and in some instances one scheduler may be nested inside another scheduler.

Further, in the embodiments described above, the interaction between independent cluster-level schedulers is described. In each of hosts 120, a host-level scheduler is also executed to schedule workloads (which are scheduled thereon by the independent cluster-level schedulers as described above) on the resources of the host. The host-level scheduling according to embodiments may be carried out in various ways, two of which are described below.

According to the first technique, the host-level scheduler is operating strictly according to the same priorities as the cluster-level schedulers and allocates available capacity to the workloads scheduled on that host by the high-priority scheduler prior to scheduling the workloads scheduled on that, host by the low-priority scheduler. If there is resource shortage on that host, the host-level scheduler can preempt existing low-priority workloads (which are workloads scheduled thereon by the low-priority scheduler) in favor of scheduling high-priority workloads (which are workloads scheduled thereon by the high-priority scheduler).

According to the second technique, the host-level scheduler operates according to resource budgets specified for the workloads. These resource budgets may specify three settings reservation (amount of host resources reserved for the workload), limit (limit on the host resource usage by the workload), and share (a value that indicates scheduling priority of the workload in relation to other workloads running on the same host). These resource budgets can be specified directly on the workloads or can be a consequence of how the resource budget allocated to a cluster-level scheduler is divvied out to the workloads managed by that scheduler. In this second technique, the host-level scheduler cannot preempt existing low-priority workloads in favor of high-priority workloads. The host resources are guaranteed once granted to the workload. Accordingly, if there is insufficient capacity in the cluster to schedule new workloads (or the capacity is fragmented across multiple hosts), then the cluster-level scheduler needs to wait on workloads to be terminated regardless of the priority assigned to the cluster-level scheduler. Once capacity frees up, the capacity can be allocated to the cluster-level scheduler based on the priority of the cluster-level scheduler.

In another embodiment, the allocation of resource budgets, e.g., the process of resource budget allocator 210, is decoupled from the processes of the cluster-level schedulers. Before any workload gets scheduled, each cluster-level scheduler assigns the budgets set by the decoupled resource budget allocator to the hosts. The cluster level scheduler takes this host-level budget allocation as input to its workload scheduling decisions. This decoupling allows the budget allocator to operate at larger time intervals than the cluster-level scheduler and it does not need to know about the workload details (e.g., placement policies and the like). In this embodiment, because the decoupled resource budget allocator assigns resource budgets to hosts independent of the workloads, this can end up causing a mismatch and fragmentation. Accordingly, a minimum chunk size is applied to the budget allocation on each of the hosts.

In the embodiments described above, live migration of workloads may be carried out for purposes of defragmentation to free up resources on one or more hosts. Beyond freeing up resources through defragmentation, there may be other technical/non-technical constraints that can require a workload to be migrated. An example of a technical constraint is the current GPU configuration. The current GPU configuration may not allow the desired workload to be placed until existing workloads are evacuated from the host and the GPU be reconfigured to match the requirements of the desired workload. An example non-technical constraint is anti-affinity between the new workload and an existing workload. If the new workload has to be run on a host that is currently running a workload with anti-affinity to the new workload, the existing workload will need to be migrated to another host.

Embodiments described above depict hosts as resource providers for the common set of resources on which workloads are scheduled by the independent schedulers. Resource providers are not limited to hosts. In further embodiments, the resource providers may be datastores onto which workloads in the form of disks are scheduled according to various technical constraints of the disks. For example, some disks may be thinly provisioned, which means that the capacity required by these disks may grow over time. There may be other disks that require encryption or to be stored in a redundant fashion.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of scheduling workloads on a common set of resources that are distributed across a cluster of hosts, using at least two independent schedulers including a high priority scheduler for scheduling high priority workloads and a low priority scheduler for scheduling low priority workloads, said method comprising:

scheduling the high priority workloads on the common set of resources using the high priority scheduler, the high priority scheduler being a resource scheduler of a virtualization management server configured to manage the cluster of hosts and a virtualization layer executing on the cluster of hosts;

deploying the high priority workloads to execute in the hosts on a first portion of the common set of resources;

scheduling the low priority workloads on the common set of resources using the low priority scheduler, the low priority scheduler being a control plane of a container orchestration system integrated with the virtualization layer; and deploying the low priority workloads to execute in the hosts on a second portion of the common set of resources, the low priority workloads including pod virtual machines running on the hosts of the cluster, which correspond respectively to nodes of the container orchestration system, the high priority workloads include other virtual machines running on the hosts of the cluster that are not pod virtual machines.

2. The method of claim 1, further comprising:
allocating a first resource budget from a total resource budget of the common set of resources to the high priority workloads and a second resource budget from the total resource budget of the common set of resources to the low priority workloads,
wherein the high priority scheduler performs the scheduling of the high priority workloads in accordance with the first resource budget and the low priority scheduler performs the scheduling of the low priority workloads in accordance with the second resource budget.

3. The method of claim 1, wherein each of the at least two independent schedulers is a cluster-level scheduler and each of the first and second resource budgets is defined for the cluster.

4. The method of claim 1, wherein each of the at least two independent schedulers is a cluster-level scheduler and each of the first and second resource budgets is defined per individual host.

5. The method of claim 1, further comprising:
scheduling workloads scheduled on an individual host by the at least two independent schedulers using a host-level scheduler.

6. The method of claim 1, further comprising:
upon determining that a high priority workload cannot be scheduled on a host, migrating one or more workloads that are currently executing in the host to another host.

7. The method of claim 1, wherein the first resource budget is defined for a subset of high priority workloads managed by the high priority scheduler and the second resource budget is defined for a subset of low priority workloads managed by the low priority scheduler.

8. The method of claim 1, wherein
said scheduling the high priority workloads includes performing defragmentation of the high priority workloads across the cluster of hosts; and
said scheduling the low priority workloads includes performing defragmentation of the low priority workloads across the cluster of hosts.

9. The method of claim 1, wherein the workloads include virtual objects and operations including live migration of virtual objects, network file copy, reserving spare capacity for high availability restarts, and selecting hosts that are to go into maintenance mode.

10. The method of claim 1, wherein the resources include CPU, memory, network, and storage.

11. A method of scheduling workloads on a common set of resources that are distributed across a cluster of hosts, using at least two independent schedulers including a high priority scheduler for scheduling high priority workloads and a low priority scheduler for scheduling low priority workloads, said method comprising:
scheduling the high priority workloads on the common set of resources using the high priority scheduler, the high priority scheduler being a resource scheduler of a virtualization management server configured to manage the cluster of hosts and a virtualization layer executing on the cluster of hosts;
deploying the high priority workloads to execute in the hosts on a first portion of the common set of resources;
scheduling the low priority workloads on the common set of resources using the low priority scheduler, the low priority scheduler being a control plane of a container orchestration system integrated with the virtualization layer; and
deploying the low priority workloads to execute in the hosts on a second portion of the common set of resources,
wherein the high priority workloads include control virtual machines running on the hosts of the cluster, the control virtual machines performing virtual machine management operations for the cluster in a distributed manner, and low priority workloads include other virtual machines running on the hosts of the cluster that are not control virtual machines.

12. A computer system comprising:
a set of resources distributed across a cluster of host computers; and
one or more processors executing a method of scheduling workloads on the set of resources, using at least two independent schedulers including a high priority scheduler for scheduling high priority workloads and a low priority scheduler for scheduling low priority workloads, said method comprising:
scheduling the high priority workloads on the common set of resources using the high priority scheduler, the high priority scheduler being a resource scheduler of a virtualization management server configured to manage the cluster of hosts and a virtualization layer executing on the cluster of hosts;
deploying the high priority workloads to execute in the hosts on a first portion of the common set of resources;
scheduling the low priority workloads on the common set of resources using the low priority scheduler, the low priority scheduler being a control plane of a container orchestration system integrated with the virtualization layer; and
deploying the low priority workloads to execute in the hosts on a second portion of the common set of resources, the low priority workloads including pod virtual machines running on the hosts of the cluster, which correspond respectively to nodes of the container orchestration system, the high priority workloads include other virtual machines running on the hosts of the cluster that are not pod virtual machines.

13. The computer system of claim 12, wherein the method further comprises:
allocating a first resource budget from a total resource budget of the common set of resources to the high priority workloads and a second resource budget from the total resource budget of the common set of resources to the low priority workloads,
wherein the high priority scheduler performs the scheduling of the high priority workloads in accordance with the first resource budget and the low priority scheduler performs the scheduling of the low priority workloads in accordance with the second resource budget.

14. The computer system of claim 13, wherein the method further comprises:
upon determining that a high priority workload cannot be scheduled on a host, migrating one or more workloads that are currently executing in the host to another host.

15. The computer system of claim 12, wherein
said scheduling the high priority workloads includes performing defragmentation of the high priority workloads across the cluster of hosts; and
said scheduling the low priority workloads includes performing defragmentation of the low priority workloads across the cluster of hosts.

16. The computer system of claim 12, wherein the other virtual machines of the high priority workloads include control virtual machines running on the hosts of the cluster, the control virtual machines performing virtual machine management operations for the cluster in a distributed manner.

17. The computer system of claim 12, wherein the workloads include virtual objects and operations including live migration of virtual objects, network file copy, reserving spare capacity for high availability restarts, and selecting hosts that are to go into maintenance mode.

18. A non-transitory computer readable medium comprising instructions to be executed in a computer system, wherein the instructions, when executed in the computer system, cause the computer system to carry out a method of scheduling workloads on a common set of resources that are distributed across a plurality of resource providers, using at least two independent schedulers including a high priority scheduler for scheduling high priority workloads and a low priority scheduler for scheduling low priority workloads, said method comprising:

scheduling the high priority workloads on the common set of resources using the high priority scheduler, the high priority scheduler being a resource scheduler of a virtualization management server configured to manage the cluster of hosts and a virtualization layer executing on the cluster of hosts;

deploying the high priority workloads to execute in the hosts on a first portion of the common set of resources;

scheduling the low priority workloads on the common set of resources using the low priority scheduler, the low priority scheduler being a control plane of a container orchestration system integrated with the virtualization layer; and deploying the low priority workloads to execute in the hosts on a second portion of the common set of resources, the low priority workloads including pod virtual machines running on the hosts of the cluster, which correspond respectively to nodes of the container orchestration system, the high priority workloads include other virtual machines running on the hosts of the cluster that are not pod virtual machines.

19. The non-transitory computer readable medium of claim 18, wherein the plurality of resource providers include one of: (a) a cluster of hosts; and (b) a plurality of datastores.

* * * * *